(12) United States Patent
Fessele et al.

(10) Patent No.: US 7,574,921 B2
(45) Date of Patent: Aug. 18, 2009

(54) PRESSURE SENSOR MOUNTING USING A MOLDED SEAL

(75) Inventors: Thomas Fessele, Stuttgart (DE); Jan Gebauer, Karlsruhe (DE); Marcell Ott, Nersingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/702,878

(22) Filed: Feb. 5, 2007

(65) Prior Publication Data

US 2007/0216105 A1  Sep. 20, 2007

(30) Foreign Application Priority Data

Feb. 7, 2006  (DE) .................... 10 2006 005 502

(51) Int. Cl.
*G01L 7/00* (2006.01)
(52) U.S. Cl. ..................................... 73/756
(58) Field of Classification Search ........... 73/700–756; 361/283.1–283.4
See application file for complete search history.

(56) References Cited

U.S. PATENT DOCUMENTS

| 3,580,988 | A | * | 5/1971 | Orlowski et al. ........ 174/153 G |
| 5,317,924 | A | | 6/1994 | Maack |
| 5,945,606 | A | * | 8/1999 | Tokunaga et al. ............. 73/756 |
| 6,050,147 | A | * | 4/2000 | Viduya et al. ................. 73/756 |
| 6,779,406 | B1 | * | 8/2004 | Kuznia et al. ................. 73/756 |
| 6,948,375 | B2 | * | 9/2005 | Nomura ....................... 73/756 |

* cited by examiner

*Primary Examiner*—Lisa M Caputo
*Assistant Examiner*—Jermaine Jenkins
(74) *Attorney, Agent, or Firm*—Kenyon & Kenyon LLP

(57) ABSTRACT

A pressure sensor including a molded seal. With the aid of the molded seal the pressure sensor is held in place in an installation hole and seals the latter. The molded seal is attached to a sensor stem in a form locked manner. The molded seal is made of an elastic material and has, on its end facing away from the sensor head, a protrusion whose diameter exceeds the diameter of the installation hole. At least one annular recess is provided on the circumference of the sensor stem.

8 Claims, 3 Drawing Sheets

PRESSURE SENSOR MOUNTING USING A MOLDED SEAL

BACKGROUND INFORMATION

In the case of pressure sensors which are used, for example, on the gas tanks of motor vehicles, molded seals are used to simplify installation of the pressure sensor. These molded seals not only provide a seal for the mechanical interface between the pressure sensor and its installation hole in a wall, but also a means for mounting the pressure sensor in the installation location. The use of a molded seal makes it possible to avoid complex mounting of the pressure sensor via a mounting flange. U.S. Pat. No. 5,317,924 describes a pressure sensor which is mounted in an installation hole via a molded seal. The pressure sensor includes a sensor head and a slender sensor stem formed thereon, in which a channel is provided. A sensor foot designed with a larger diameter is situated at the end of the sensor stem facing away from the sensor head. In mounting the molded seal on the sensor stem, a through opening in the molded seal is widened to the extent that the sensor foot at the lower end of the sensor stem passes through the opening in the molded seal, which is made of an elastic material, and, after passage of the sensor foot, the molded seal is accommodated on the sensor stem of the pressure sensor in a form locked manner, as described in U.S. Pat. No. 5,317,924. The molded seal according to U.S. Pat. No. 5,317,924 has a widened collar on its bottom as well as multiple sealing lips provided on its outer circumferential surface.

The disadvantage of the pressure sensor known from U.S. Pat. No. 5,317,924 is the fact that, due to the plunger foot designed with an enlarged diameter at the lower end of the sensor stem, burr free manufacture of this sensor stem is difficult. This is due to the fact that the sensor component, which is generally manufactured as a built in component by plastic injection molding and includes a sensor head, stem and foot, must be removed from two mold halves, and an undercut inevitably forms between the elongated sensor stem and the sensor foot, which is designed with a larger diameter. When mounting the pressure sensor having the molded seal placed on the sensor stem in the installation hole, e.g., on the gas tank of a motor vehicle, there is the danger of the molded seal becoming compressed on the slender sensor stem on passing the protrusion designed with an enlarged diameter at the lower end of the molded seal. If the molded seal made of an elastic material is compressed on the sensor stem, the installation hole, e.g., on the gas tank of a motor vehicle, is not adequately sealed. The method known from U.S. Pat. No. 5,317,924 for mounting a pressure sensor having a molded seal in an installation hole does not achieve a completely satisfactory state, due to the disadvantages described above.

SUMMARY OF THE INVENTION

In light of the described disadvantages of the method according to the related art, an object of the present invention is to provide a pressure sensor in which the force needed for mounting and dismounting is limited and in which the sensor reliably seals an installation hole with regard to its fitting length.

According to the present invention, a pressure sensor is provided, on the sensor stem of which a molded seal may be accommodated in a form locked manner, at least one annular recess being provided on the circumference of the slender sensor stem. This at least one annular recess on the sensor stem enables the molded seal, on the inside of which is provided a bead which is complementary to the annular recess on the sensor stem, to be held axially in place on the sensor stem. The sensor stem, which is preferably manufactured as an injection molded plastic component in one piece with the pressure sensor housing, may thus be manufactured without burrs on its outer circumferential surface, thereby achieving the required sealing action. In a preferred exemplary embodiment, a further annular recess is produced on the sensor stem, which, when viewed in the axial direction of the sensor stem, lies below the aforementioned annular recess. This further, second annular recess provided on the circumferential surface of the sensor stem causes the flexible, elastic material from which the molded seal is made to be displaced into this second annular recess when the pressure sensor is mounted in the installation hole. Since the flexible sealing material of the molded seal and the radial forces generated thereby are displaceable into this recess during mounting, a significant reduction in mounting force is achievable. The at least one annular recess mentioned initially may therefore have either a rectangular, triangular or chamfered cross section, the design of which is complementary to the bead on the inside of the molded seal. To simplify mounting of the molded seal on the sensor stem of the pressure sensor, the bead on the inside of the molded seal may be chamfered. Furthermore, a shoulder which limits the at least one annular recess is provided on the sensor stem so that, particularly upon dismounting of the pressure sensor, the molded seal is supported thereon and does not slip off the sensor stem.

The second annular recess provided on the sensor stem in the preferred exemplary embodiment is preferably situated in the area of the molded seal's largest diameter. During mounting of the pressure sensor in the premounted state, i.e., after positioning the molded seal, the largest volume of sealing material is displaced into the second annular recess in the sensor stem when the pressure sensor and the molded seal placed thereon are mounted. This makes it possible to significantly reduce the mounting force of the pressure sensor. If the pressure sensor, including the molded seal provided thereon, is accommodated in the installation hole, a protrusion designed with an enlarged diameter forms on the side of the molded seal facing away from the sensor head on the bottom of the wall of a tank or container delimiting the installation hole, so that the pressure sensor is held in place in the mounting location by the molded seal, and the installation hole is sealed. When the pressure sensor is dismounted, or if, for example, an elevated pressure occurs inside a tank, the protrusion of the molded seal rests against the circumference of the installation hole, due to the undercut at the installation position. If the dismounting force or the applied pressure is increased, the sealing material of the molded seal expands in length and slides along the stem.

To enable the pressure sensor, including the premounted molded seal, to be installed in installation holes of varying axial lengths, multiple sealing lips are preferably provided on the outside of the molded seal. Due to the sealing length of the molded seal, at least two sealing lips always remain on the inner diameter of the installation hole, which is additionally sealed by the protrusion provided on the bottom of the molded seal. The molded seal, and thus also the sensor stem of the pressure sensor guided therein, is always supported on the inner diameter of the installation hole, which effectively prevents tilting and leakages induced thereby.

DETAILED DESCRIPTION

Figure 1:
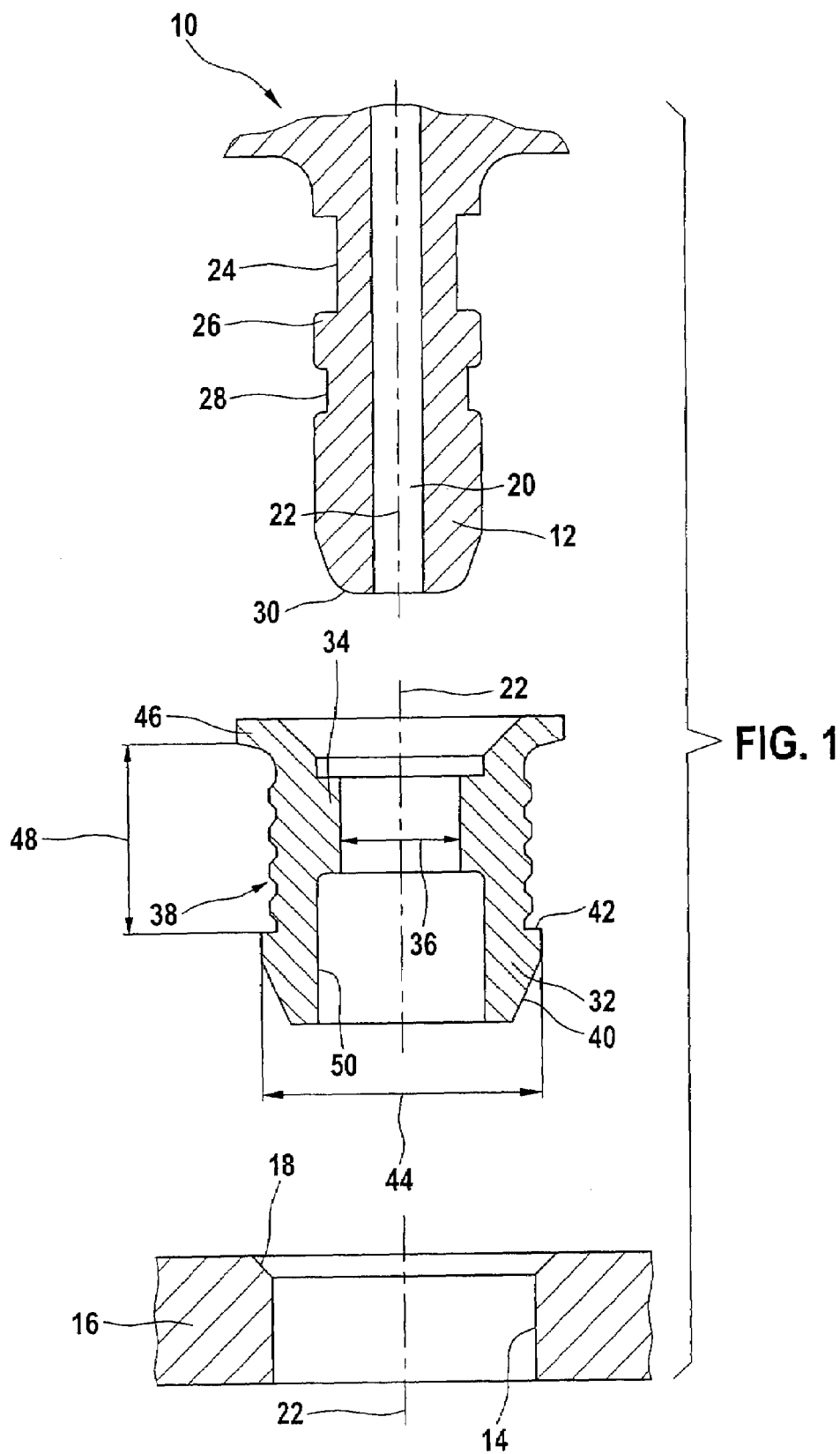
FIG. 1 shows an exploded view of the sensor stem provided according to the present invention, the molded seal surround

The representation according to FIG. 1 shows an exploded drawing of the sensor stem, the elastic molded seal, and the installation hole.

In the representation according to FIG. 1, pressure sensor 10, which is only partially shown, has a slender sensor stem 12 in which a sensor channel 20 is provided symmetrically in relation to the sensor's axis of symmetry 22. Pressure sensor 10 and sensor stem 12 are preferably manufactured as a one piece component by plastic injection molding. At least one annular recess 24 and preferably also a further, second annular recess 28 are formed on the circumferential surface of sensor stem 12. The at least one first annular recess 24 is delimited by a shoulder 26 on the circumferential surface of sensor stem 12. Viewed in the axial direction, the length of the at least one first annular recess 24 on sensor stem 12 is dimensioned to be greater than the length of further, second annular recess 28 preferably provided on sensor stem 12. In the representation according to FIG. 1, a stem rounding 30 is provided on the end face of sensor stem 12. Instead of this stem rounding 30, a chamfer or the like may also be provided on the end face in the area of the opening of sensor channel 20 to make it easier to join a molded seal 32 to sensor stem 12.

A cross section of molded seal 32 is also shown in FIG. 1. Molded seal 32 is positioned symmetrically in relation to axis of symmetry 22 and has a collar 46 on its upper side, e.g., on the end facing a sensor head. According to the representation in FIG. 1, an outer sealing surface 38, on which a number of sealing lips are provided, runs along the outside of molded seal 32. Outer sealing surface 38 extends along a sealing length 48 on the outside of molded seal 32, so that installation holes 14 of varying axial lengths may be reliably sealed. According to the representation in FIG. 1, a protrusion 42 having a diameter 44 which exceeds the outer diameter of outer sealing surface 38 in molded seal 32 is provided on the bottom of molded seal 32. On the outside of protrusion 42, a lead in chamfer 40, in turn, is provided, which facilitates insertion of pressure sensor 10, on whose sensor stem 12 molded seal 32 is provided, into installation hole 14.

The representation according to FIG. 1 also shows an installation hole 14 in a container wall 16, this hole having a bevel 18 at one end and being positioned symmetrically in relation to axis of symmetry 22. A bead shaped projection 34 having an inner diameter 36 is provided on the inside of molded seal 32. The geometry of bead shaped projection 34 on the inside of molded seal 32 is designed to be complementary to the at least one first annular recess 24 on sensor stem 12. When molded seal 32 is mounted on sensor stem 12, bead shaped projection 34 engages with at least one first annular recess 24 on the circumference of sensor stem 12 and in this manner fixes molded seal 32 in place on the circumference of sensor stem 12. Further, second annular recess 28, which is provided on the circumference of sensor stem 12 in a preferred exemplary embodiment thereof, preferably lies in the area in which its greatest diameter is located on an inner surface 50 of molded seal 32.

Figure 2:
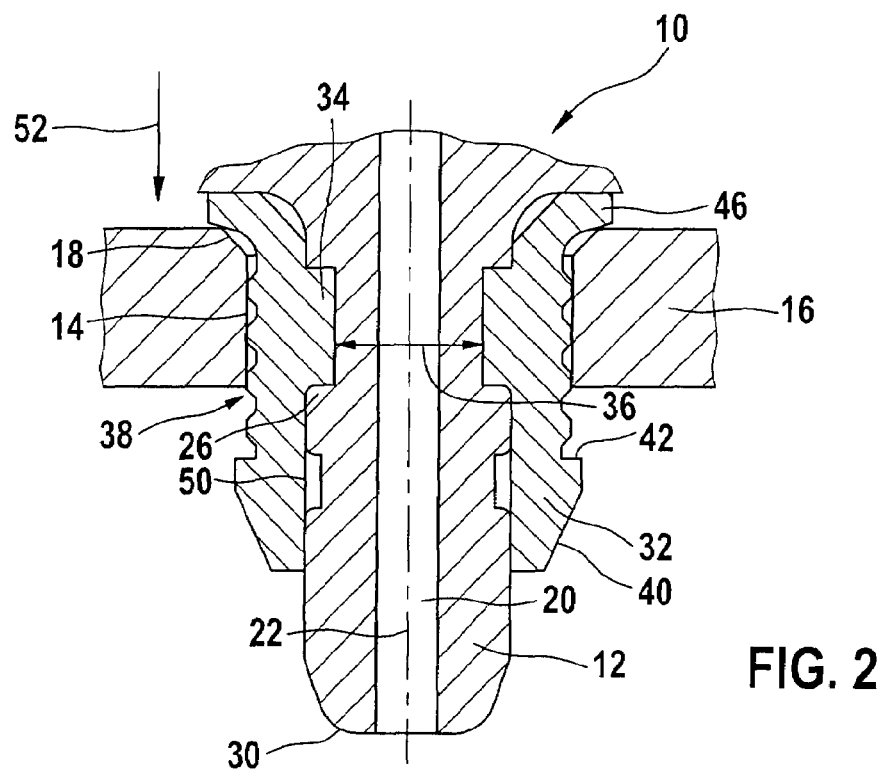
- FIG. 2 shows the mounting of the pressure sensor, including the premounted molded seal, in an installation hole.

The representation according to FIG. 2 shows the mounting of the pressure sensor according to the exploded view in FIG. 1 in an installation hole of a container, such as a motor vehicle gas tank.

According to the representation in FIG. 2, molded seal 32 on sensor stem 12 is held in place by the engagement of bead shaped projection 34 having inner diameter 36 with at least one annular recess 24 on sensor stem 12. This form locked connection between molded seal 32 and sensor stem 12 prevents an axial migration of molded seal 32 on sensor stem 12. In the premounted state of molded seal 32, collar 46 is pressed onto the upper face of wall 16. The mounting direction in which premounted pressure sensor 10, including molded seal 32 accommodated on its sensor stem 12, is inserted into installation hole 14 is identified by arrow 52. In the case of pressure sensor 10 provided according to the present invention, the mounting force is reduced by preferably providing a further, second annular recess 28 on the circumference of sensor stem 12 diametrically opposed to protrusion 42 of molded seal 32. The elastic material of molded seal 32 is displaceable into this recess after the molded seal has been mounted in the installation hole so that the radial forces occurring in mounting direction 52 are limited when pressure sensor 10 is mounted in installation hole 14. After the elastic material of molded seal 32 enters the installation hole in wall 16, this material expands radially to the outside and assumes its original shape. Protrusion 42 regains its original outer diameter 44 so that an undercut is formed between the bottom of wall 16 and the top of protrusion 42 (see representation according to FIG. 3).

According to the representation in FIG. 2, the sealing lips provided on outer sealing surface 38 rest against and seal the wall of installation hole 14 when pressure sensor 10 is in the mounting position shown in FIG. 2. Collar 46 of molded seal 32 is also positioned on the top of wall 16. Easy joining of sensor stem 12 and molded seal 32 is facilitated by the fact that a rounding 30 or even a lead in chamfer is providable on the end of sensor stem 12 facing away from the sensor head to avoid damage to molded seal 32 when it is joined to sensor stem 12. Moreover, the insertion of molded seal 32 into installation hole 14 is facilitated by the fact that a lead in chamfer 40 is formed below protrusion 42 on molded seal 32 and, in interaction with bevel 18 on the top of installation hole 14, facilitates the mounting of premounted pressure sensor 10, i.e., molded seal 32 placed on sensor stem 12 and fixed in place in a form locked manner, into installation hole 14.

Figure 3:
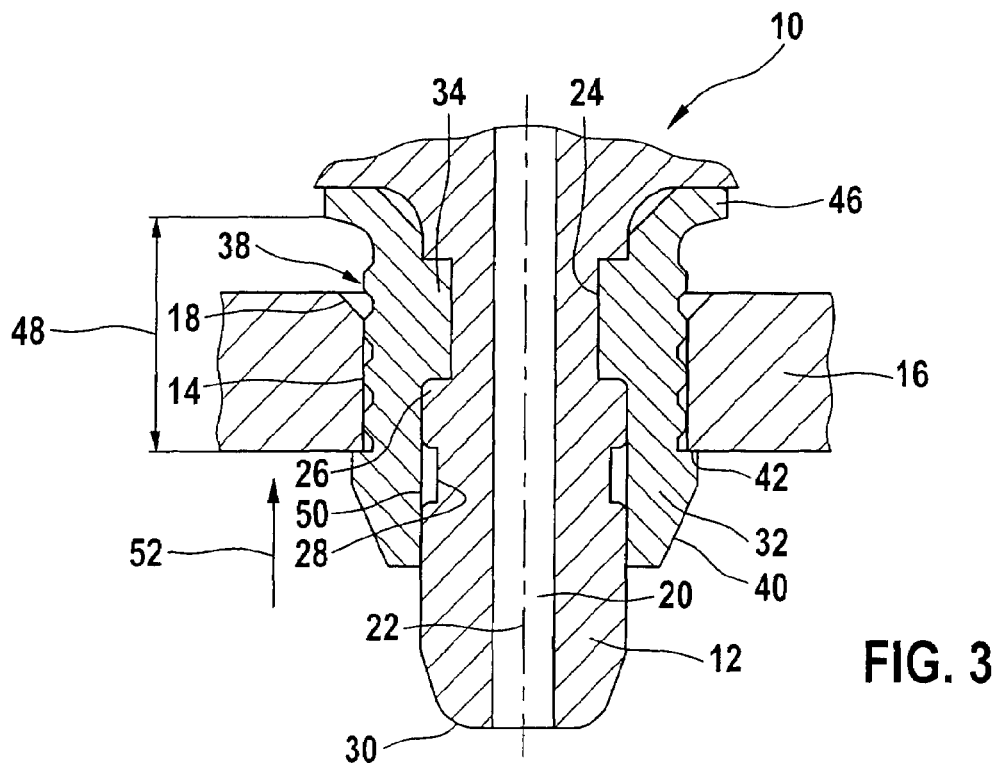
FIG. 3 shows the dismounting of the pressure sensor, including the molded seal, from the installation hole.

FIG. 3 shows the pressure sensor illustrated in the mounted state in FIG. 2 during dismounting.

According to the representation in FIG. 3, protrusion 42 of molded seal 32 rests, due to the undercut, against the bottom of wall 16 in which installation hole 14 is provided. Installation hole 14 in wall 16 is also sealed in this embodiment by three sealing lips on outer sealing surface 38 of molded seal 32, which rest against the wall of installation hole 14. This state exists when pressure sensor 10 is to be dismounted from installation hole 14, or the pressure prevailing inside the container delimited by wall 16 is higher than the pressure on the outside of the container delimited by wall 16. If the external dismounting force or the pressure present inside the container is further increased, the sealing material of molded seal 32 expands axially in length and slides along the circumferential surface of sensor stem 12. The form locked connection between bead like projection 34, which extends into at least one recess 24 introduced into the circumference of sensor stem 12, prevents the seal from slipping off the circumferential surface of sensor stem 12. If pressure sensor 10 is to be dismounted from installation hole 14, molded seal 32 is expanded during dismounting and slides along sensor stem 12. If pressure sensor 10 is withdrawn until molded seal 32, which is still engaged with the container wall via protrusion 42, is located at the end of sensor stem 12, molded seal 32 is able to yield, and protrusion 42 is released. The force required to dismount pressure sensor 10 thus depends, among other things, on the length of sensor stem 12.

As shown by the representation according to FIG. 3, molded seal 32 always rests against the delimiting wall of installation hole 14 via at least two sealing lips which are distributed over sealing length 48 on outer sealing surface 38. This ensures that the pressure sensor is always supported on the inner diameter of installation hole 14 and tilting and any resulting leakage are prevented. Although an axial tensile force must be applied to the pressure sensor to dismount pressure sensor 10 according to the representation in FIG. 3, this force is limited, since the volume of the elastic material of molded seal 32 is able to yield.

The representation according to FIG. 3 also shows that, due to the axial extension of sealing length 48 in relation to outer sealing surface 38, it is possible to seal installation holes 14 which are provided in walls 16 of varying thicknesses. Due to the arrangement of the sealing lips along outer sealing surface 38, viewed in the axial direction, two sealing surfaces always rest against the delimiting wall of installation hole 14.

Figure 4:
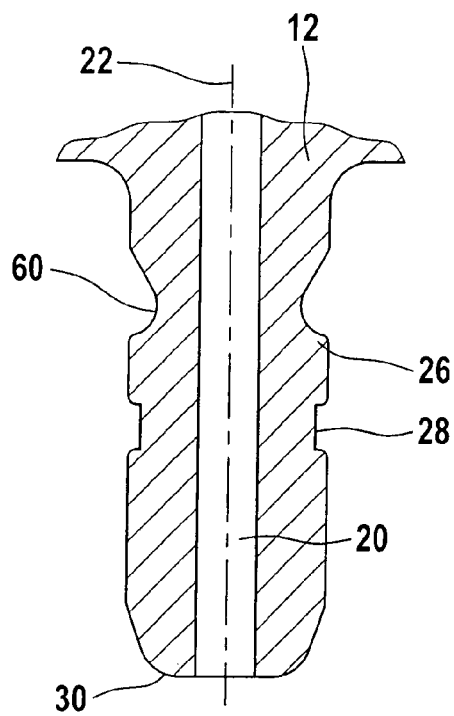
FIG. 4 shows an embodiment variant of the sensor stem.

The representation according to FIG. 4 shows an embodiment variant of the sensor stem.

The representation according to FIG. 4 shows that sensor stem 12, in which pressure channel 20 is provided, may also be manufactured with at least one rounded recess 60 which has a chamfer in its upper area above shoulder 26 and transitions into a rounding in shoulder 26. Conversely, second annular recess 28 which is preferably provided on pressure sensor 10 is produced in a manner similar to the embodiment of sensor stem 12 according to the representation in FIG. 1. Sensor stem 12 of pressure sensor 10 provided according to the present invention may be manufactured without burrs in the area of its circumferential surface; any burrs which form upon ejection from the plastic injection mold occur within recesses 24, 28 or 60. Any possible leakage along a burr over the entire length of molded seal 32 is avoided by this design.

Figure 5:
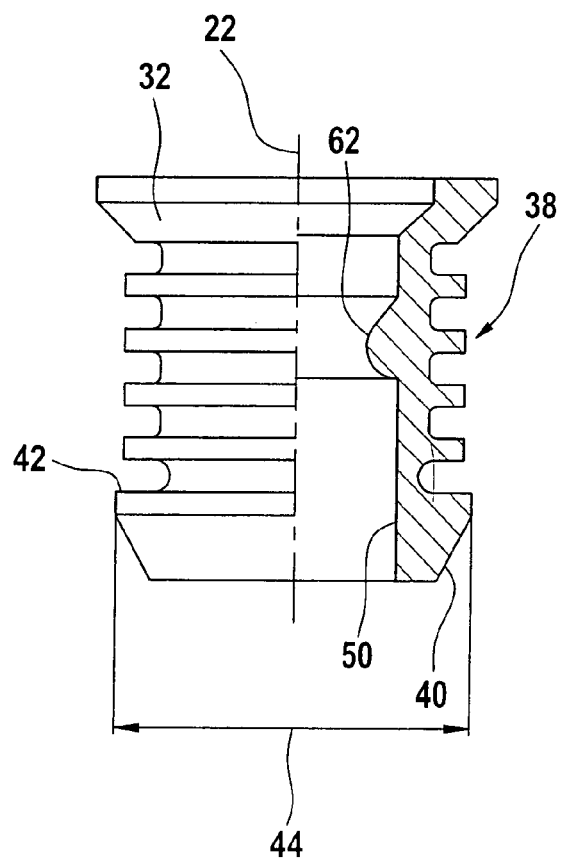
FIG. 5 shows a molded seal for mounting on a sensor stem according to the illustration in FIG. 4.

FIG. 5 shows an embodiment variant of the molded seal which is fixable to the sensor stem illustrated in FIG. 4.

Molded seal 32 illustrated in FIG. 5 has, above inner surface 50, a rounded, bead shaped projection 62 which is designed to be complementary to the at least one first rounded annular recess in sensor stem 12 having a lead in chamfer. In the illustration according to FIG. 5, multiple sealing lips are provided on outer sealing surface 38. Molded seal 32 according to the representation in FIG. 5 also has protrusion 42 designed with diameter 44, which exceeds the diameter of outer sealing surface 38 of molded seal 32. The rounded bead shaped projection is identified by reference numeral 62 and is positioned, when viewed from the axial direction, above the inner surface of molded seal 32 identified by reference numeral 50. Protrusion 42 of molded seal 32 according to the representation in FIG. 5 also has lead in chamfer 40 on the end facing installation hole 14 to facilitate mounting.

What is claimed is:

1. A pressure sensor comprising:
   a molded seal for mounting the pressure sensor in an installation hole, the molded seal being made of an elastic material and having, on an end facing away from a sensor head, a protrusion whose diameter exceeds a diameter of the installation hole; and
   a sensor stem on which the molded seal is accommodated in a form locked manner, at least one annular recess being situated on a circumference of the sensor stem;
   wherein a further annular recess is situated on the sensor stem, into which sealing material of the molded seal is displaced when the pressure sensor is inserted into the installation hole, and out of which the sealing material of the molded seal is displaced after the protrusion and the further annular recess clear the installation hole;
   wherein the further annular recess is completely free of the sealing material of the molded seal, when the molded seal is accommodated on the sensor stem and the protrusion and the further annular recess are outside of the installation hole.

2. The pressure sensor according to claim 1, wherein the molded seal has a bead shaped projection which engages with the at least one annular recess of the sensor stem.

3. The pressure sensor according to claim 2, wherein a geometry of the bead shaped projection is complementary to a geometry of the at least one annular recess on the sensor stem.

4. The pressure sensor according to claim 2, wherein the molded seal has an outer sealing surface on which a number of sealing lips are situated.

5. The pressure sensor according to claim 2, wherein a shoulder supporting the bead shaped projection is situated on the sensor stem.

6. The pressure sensor according to claim 1, wherein the at least one annular recess on the sensor stem has one of a rectangular, triangular and rounded cross section including a lead-in chamfer.

7. The pressure sensor according to claim 1, wherein the further annular recess is situated on the sensor stem in such a way that, when the molded seal is in a mounted state, the recess is situated opposite an area of the molded seal in which the molded seal has a maximum outer diameter.

8. The pressure sensor according to claim 1, wherein the sensor is used in a fuel tank of a motor vehicle.

* * * * *